Figure 1:
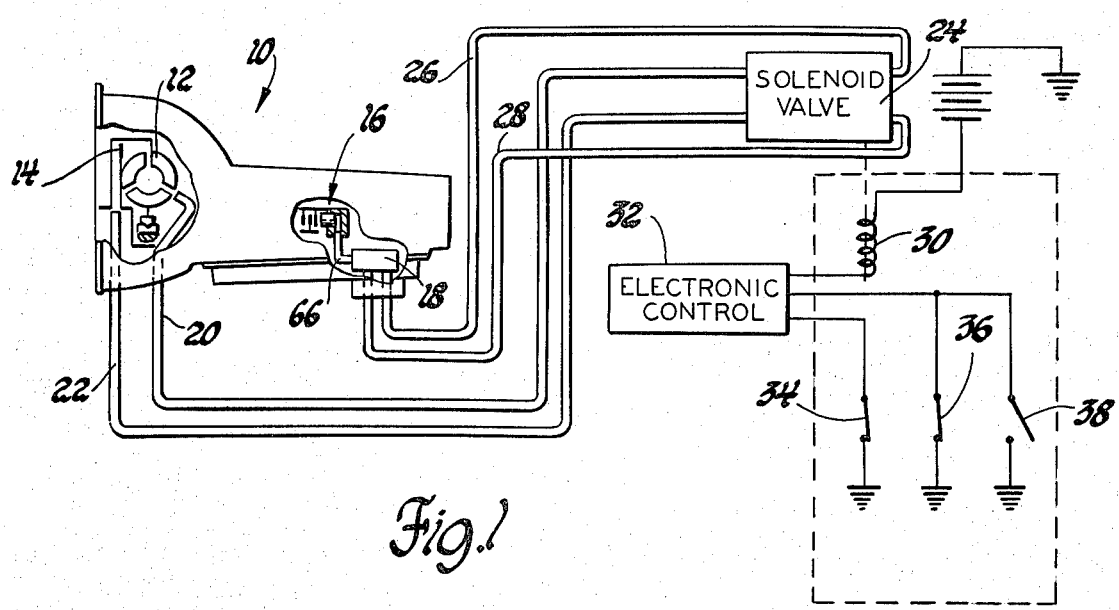

United States Patent [19]

Kapp

[11] 4,416,358

[45] Nov. 22, 1983

[54] ELECTRO-HYDRAULIC CONTROL FOR A TRANSMISSION HAVING A TORQUE CONVERTER CLUTCH

[75] Inventor: Gerald E. Kapp, Lansing, Mich.

[73] Assignee: General Motors Corporation, Detroit, Mich.

[21] Appl. No.: 265,834

[22] Filed: May 21, 1981

[51] Int. Cl.³ .................. B60K 41/22; F16D 25/10
[52] U.S. Cl. .......................... 192/3.32; 192/3.31; 192/3.58
[58] Field of Search .................. 192/3.58, 3.26, 3.25, 192/3.31, 3.32, 3.29, 3.28, 87.13, 87.12, 87.11, 192/87.1, 0.033, 103 R; 74/869, 868, 731, 732

[56] References Cited

U.S. PATENT DOCUMENTS 3,857,302 12/1974 Morris .......................... 192/3.3 X
4,095,486 6/1978 Ohnuma ....................... 192/3.29 X
4,298,105 11/1981 Duhaime ....................... 192/3.31 X Primary Examiner—George H. Krizmanich
Attorney, Agent, or Firm—Donald F. Scherer

[57] ABSTRACT

A transmission control for an automatic shifting multi-ratio transmission having a torque converter clutch including a solenoid-operated valve. The solenoid-operated valve controls the operating condition of the torque converter clutch in response to an electronic control which is conditioned by a number of operating parameters and also including at least one pressure-operated electric switch. The one pressure-operated electric switch is responsive to the fluid pressure level in one of the friction devices for controlling one transmission ratio. Whenever the pressure-operated electric switch is actuated or deactuated, the torque converter clutch is momentarily disengaged to provide a smoother ratio change in the transmission.

2 Claims, 2 Drawing Figures

ELECTRO-HYDRAULIC CONTROL FOR A TRANSMISSION HAVING A TORQUE CONVERTER CLUTCH

This invention relates to controls for automatic shifting transmissions and more particularly to electro-hydraulic controls for a torque converter clutch used with automatic shifting transmissions.

In an effort to reduce fuel consumption, many automatic transmissions are utilizing a torque converter clutch to eliminate hydraulic slippage in the transmission during some operating conditions. There are many operating conditions during which the torque converter clutch can be engaged to improve the overall efficiency of the transmission. It is, however, desirable to disengage the clutch during the interchange of ratios (i.e., upshift or downshift) in the transmission thereby eliminating or significantly reducing the shift shock which may be present.

The present invention provides an improved control for a multiratio transmission having a torque converter clutch wherein the torque converter is controlled to be momentarily disengaged during a ratio interchange in the transmission.

The present invention further provides improvement in controls for multiratio transmissions having a torque converter clutch wherein the engagement or disengagement of a friction device controlling a portion of the transmission speed ratio apparatus results in a pressure change which operates a pressure responsive electrical switch operative to cause momentary disengagement of the torque converter clutch.

Figure 2:
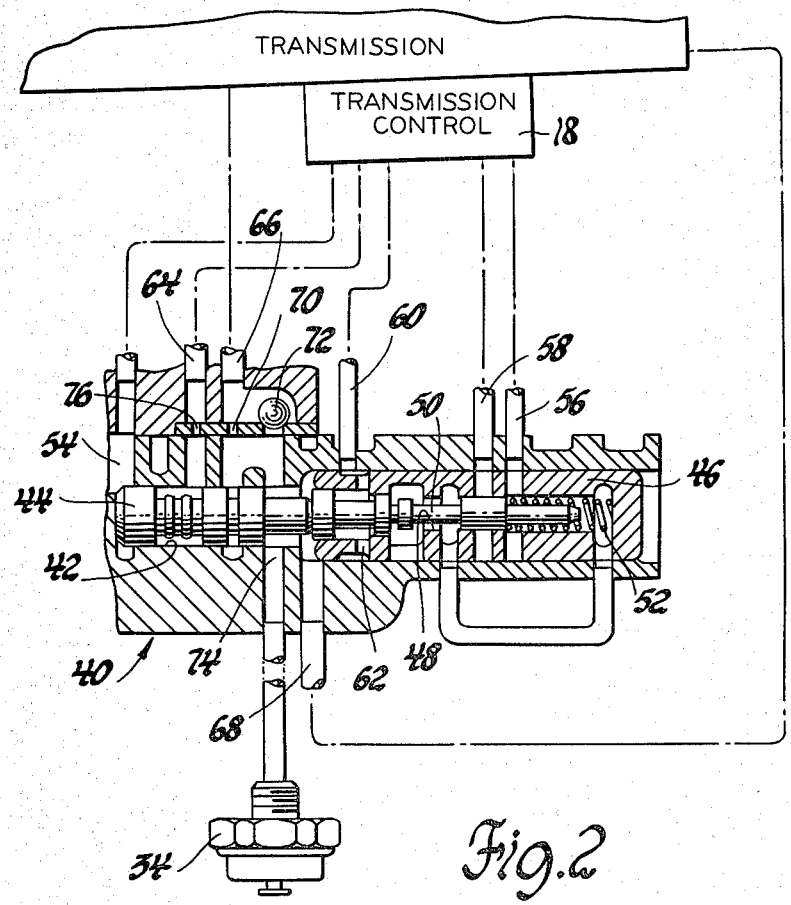

The advantages of the present invention will be more apparent from the following description and drawings in which:

FIG. 1 is a diagrammatic representation of a transmission and control mechanism; and FIG. 2 is a diagrammatic representation of a specific portion of the transmission control.

Referring to the drawings, there is seen in FIG. 1 a transmission, generally designated 10, including a conventional torque converter 12 and a torque converter clutch 14. The torque converter 12 is connected in a well-known fashion to drive a multispeed ratio transmission such as that shown in U.S. Ser. No. 200,959, filed Oct. 27, 1980, and assigned to the assignee of this application.

The multiratio transmission includes a fluid-operated friction clutch 16. The torque converter clutch 14 and friction clutch 16 are operated by fluid pressure which is distributed by a transmission control mechanism 18 which may by constructed in accordance with the above-mentioned U.S. Ser. No. 200,959. The torque converter clutch is designed to be engaged by fluid pressure in passage 20 and disengaged by fluid pressure in passage 22. The fluid pressure in passages 20 and 22 is controlled by a solenoid valve 24 which is in fluid communication through passages 26 and 28 with the transmission control 18. The solenoid valve 24 can, if desirable, include a separate converter clutch shift valve.

An operating coil 30 of the solenoid 24 is energized and deenergized by an electronic control 32 which may be constructed in accordance with those currently used on some of the vehicles commercially available. The electronic control 32 is responsive to a number of operating parameters such as vehicle speed, engine torque level and engine temperature to ensure that proper engine operating conditions are present before the torque converter clutch 14 is engaged. The electronic control 32 is also responsive to a third clutch switch 34, a fourth control switch 36 and a 4-3 switch 38. These switches 34, 36 and 38 are conventional pressure-operated electric switches.

The 4-3 switch 38 operates in a system such as that shown in U.S. Ser. No. 094,692 filed Nov. 16, 1979, and assigned to the assignee of this application. The fourth clutch switch 36 responds to fluid pressure in the friction device which establishes the fourth drive ratio to control the clutch engagement when the fourth ratio is established. The third clutch switch 34 is operative to momentarily disengage the torque converter clutch during a ratio change from the second ratio to the third ratio and vice versa. Thus, it is only necessary to use a single switch to signal the ratio interchange between second and third.

FIG. 2 diagrammatically depicts the 2-3 shift valve utilized with the transmission control. This 2-3 shift valve is generally designated 40. It is substantially the same as the 2-3 shift valve shown in U.S. Ser. No. 200,959, previously mentioned. The shift valve 40 includes a valve bore 42 in which is slidably disposed a valve spool 44, and a sleeve member 46 having a stepped valve bore 48 in which is slidably disposed a spool valve 50.

The spool valves 50 and 44 are urged to the left by a spring 52. The valve spool 44 and therefore valve spool 50 are urged to the right or upshifted position by a speed-sensitive bias pressure present in passage 54 and operating on the left of the valve spool 44. The valve spool 50 is operated on by a TV upshift pressure in passage 56 and a TV downshift pressure in passage 58. The pressure in passage 56 urges the valve spools 50 and 44 to remain in the downshifted position shown, while the pressure in passage 58 is effective to urge the valve spools 50 and 44 to return to the downshifted position shown after an upshift has occurred. A more complete description of these operating pressures and their effect can be found in U.S. Ser. No. 200,959. A conventional detent pressure is provided through a passage 60 which communicates to the valve spool 50 through a plurality of passages 62 formed in sleeve 46.

The valve spool 44 controls the distribution of pressure from passage 64 to passage 66 and from passage 66 to an exhaust passage 68. The passage 64 is pressurized whenever the transmission control is conditioned by the operator for Reverse, Neutral, Drive-4 or Drive-3 operation. The passage 66 is connected to the friction clutch 16. This passage 66 is also in fluid communication through a restriction 70 and a one-way ball valve 72 with the valve spool 44. The valve spool 44 also has connected therewith a fluid passage 74 which is in fluid communication with the third clutch switch 34.

In the position shown, the 2-3 shift valve 40 is downshifted to establish the lower or second gear ratio in the transmission. Assuming the other operating conditions are satisfactory, the transmission will be operating in second gear. Also, assuming the electronic control 32 is satisfied that the engine operating conditions are adequate, the torque converter clutch 14 will be engaged. If the bias pressure in passage 54 is sufficient to overcome the bias pressure in passage 56 and the force in spring 52, the valve spool 44 will be upshifted thereby providing fluid communication from passage 64 through a restriction 76 to the passage 74 and also to passage 66 through restriction 70 and one-way ball check 72. The pressure in passage 74 will rise simultaneously with the pressure in passage 66.

The switch 34 is designed to open, or be pressure-actuated, prior to the pressure in passage 66 being sufficient to engage the clutch 16. When the switch 34 is actuated, the electronic control 32 recognizes this change in operating condition and momentarily triggers the solenoid valve 24 to disengage the torque converter clutch 14. Thus, on a ratio change from second gear to third gear, the torque converter clutch 14 is disengaged. The electronic control 32 will, after a predetermined time, signal the solenoid valve 24 to reengage the torque converter clutch 14 to improve the operating efficiency while the transmission is operating in third gear.

If the bias pressure in passage 58 and spring 52 becomes great enough to overcome the bias pressure in passage 54, the valve spool 44 will be returned from the upshift position to the downshift position shown. When this occurs, the fluid adjacent the spool valve 44 in passage 74 will be connected immediately to exhaust 68 while the pressure in passage 66 will decay less rapidly due to the restriction 70 in ball check 72. The third clutch switch 34 will be subjected to exhaust and therefore deactuated prior to the clutch 16 being disengaged. Deactuation of the clutch switch 34 signals the electronic control 32 to trigger the solenoid valve 24 so that disengagement of the torque converter clutch 14 will occur. The torque converter clutch 14 will be disengaged for a time established by the electronic control 32. The pressure operating clutch 16 will be fully decayed during this time interval such that third gear will be disestablished and second gear will be established while the torque converter clutch 14 is disengaged.

From the foregoing description, it is apparent that a single electrical switch can be utilized to signal for the disengagement of the torque converter clutch during both an upshift and downshift condition in the automatic transmission.

The embodiments of the invention in which an exclusive property or privilege is claimed are defined as follows:

1. A control for a multispeed ratio automatic shifting transmission having a torque converter and a selectively engageable clutch for bypassing the torque converter, said control comprising; a pressure passage; shift valve means selectively operable for providing a ratio interchange between a high speed ratio and a low speed ratio including passage means connected to means for establishing said high speed ratio, a restriction in the passage means, an exhaust passage and a slidable valve member operable to selectively connect said passage means to said pressure passage to establish the high speed ratio or to said exhaust passage when the low speed ratio is established; electric switch means responsive to the pressure in said passage means between said valve member and said restriction for actuation when said passage means is pressurized and deactuation when said passage means is exhausted; and means for controlling the engagement and disengagement of the selectively engageable clutch and being responsive to actuation or deactuation of said electric switch means to momentarily disengage said clutch when said passage means is pressurized to establish the higher ratio or exhausted to disestablish the higher ratio.

2. A control for a multispeed ratio automatic shifting transmission having a torque converter with a selectively engageable torque converter clutch for bypassing the torque converter, and a pressure-operated friction clutch selectively engaged to establish one drive ratio, said control comprising; a pressure passage; shift valve means selectively operable for controlling the friction clutch and provide a ratio interchange between a high speed ratio when the friction clutch is engaged and a low speed ratio when the friction clutch is disengaged including passage means connected to said friction clutch for establishing said high speed ratio, a restriction in the passage means, an exhaust passage and a slidable valve member operable to selectively connect said passage means to said pressure passage to engage said friction clutch or to said exhaust passage to disengage said friction clutch; electric switch means responsive to the pressure in said passage means between said valve member and said restriction for actuation when said passage means is pressurized and deactuation when said passage means is exhausted; and means for controlling the engagement and disengagement of the selectively engageable torque converter clutch and being responsive to actuation or deactuation of said electric switch means to momentarily disengage said torque converter clutch when said passage means is pressurized to engage said friction clutch or exhausted to disengage said friction clutch.

* * * * *